June 20, 1933. W. DE BACK 1,914,633
BELT TIGHTENING APPARATUS FOR FRUIT SIZING MACHINES
Filed July 30, 1930 2 Sheets-Sheet 1

INVENTOR.
William de Back.
BY
ATTORNEYS.

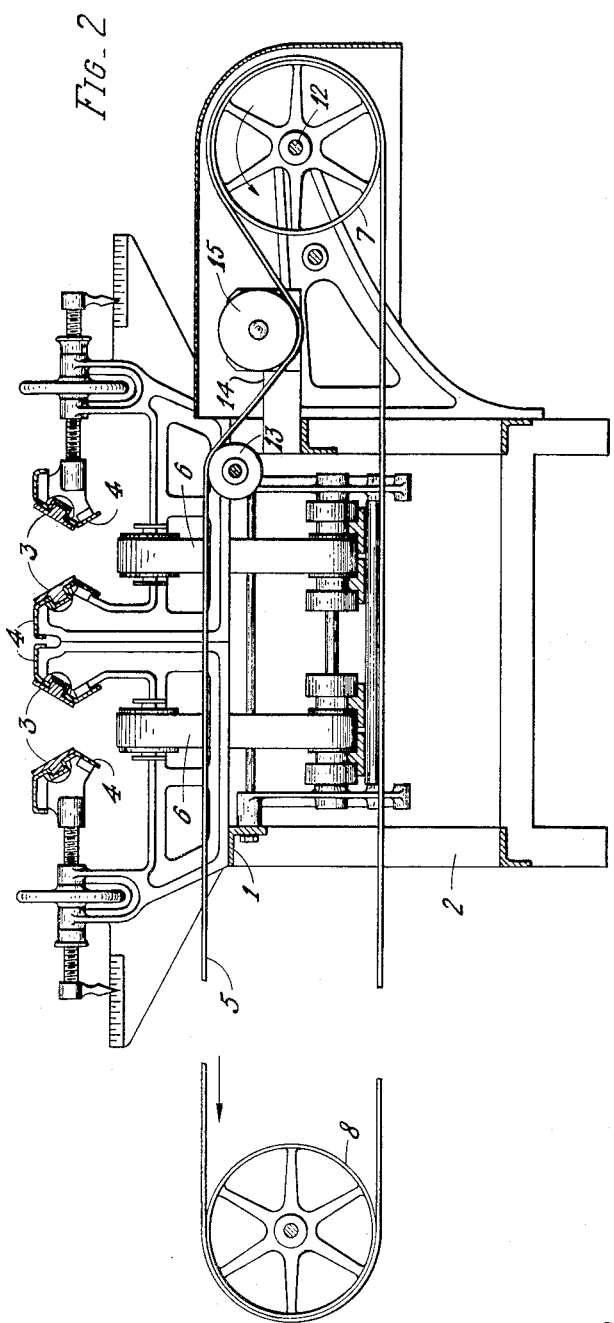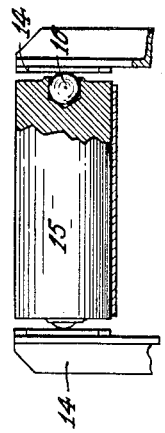

Patented June 20, 1933

1,914,633

UNITED STATES PATENT OFFICE

WILLIAM DE BACK, OF SAN JOSE, CALIFORNIA, ASSIGNOR TO FOOD MACHINERY CORPORATION, OF SAN JOSE, CALIFORNIA, A CORPORATION OF DELAWARE

BELT TIGHTENING APPARATUS FOR FRUIT SIZING MACHINES

Application filed July 30, 1930. Serial No. 471,803.

This invention relates to belt tightening mechanism and has particular reference to a slack take-up mechanism for packing belts, such as used in connection with fruit sizing machines. One type of sizing machine is illustrated in my co-pending application, Serial No. 471,804 filed July 30, 1930.

Such machine includes one or more pairs of divergently moving sizing belts arranged in trough like relation upon which the fruit to be sized is carried until the belts have diverged a sufficient amount to allow each fruit to be released and deposited in that group to which it belongs. Each fruit as it is released from the sizing belts is received by a supplementary moving carrier belt positioned there-beneath which deposits it upon a suitable packing belt which carries it to an accessible point for packing. In order that the fruit may be separated into a plurality of groups of different sizes, a number of these packing belts are provided.

It has been discovered in practice, that in running a quantity of fruit through the machine the proportion delivered to each packing belt will vary from time to time, thus making it necessary for the packers to move about from belt to belt in order to take care of such variations.

To allow for such moving about, and from a standpoint of safety and economy, it is desirable that the aisle between the belts be unobstructed and it is therefore necessary that the packing belts be driven from their receiving ends. In order to enable this to be done, I have devised a novel slack take-up mechanism discussed herein.

It is therefore an object of my invention to provide a sizing machine with packing belts which can be driven from their receiving end.

It is also an object to provide a slack take-up mechanism for packing belts which will allow them to be driven from their receiving end.

A further object is to provide a belt tightening mechanism which will not only take up the slack in the belt but which will maintain the runs in parallel relation to each other.

Another object is to construct a belt tightening mechanism which shall have a minimum number of parts and which shall be efficient in operation and cheap to manufacture.

Further objects and advantages will become apparent as the description proceeds in connection with the accompanying drawings, in which:—

Fig. 2 is a sectional view taken along the line 2—2 of Fig. 1, looking into the direction of the arrows.

Fig. 3 is a detail of one of the slack take-up rollers.

Figure 1:
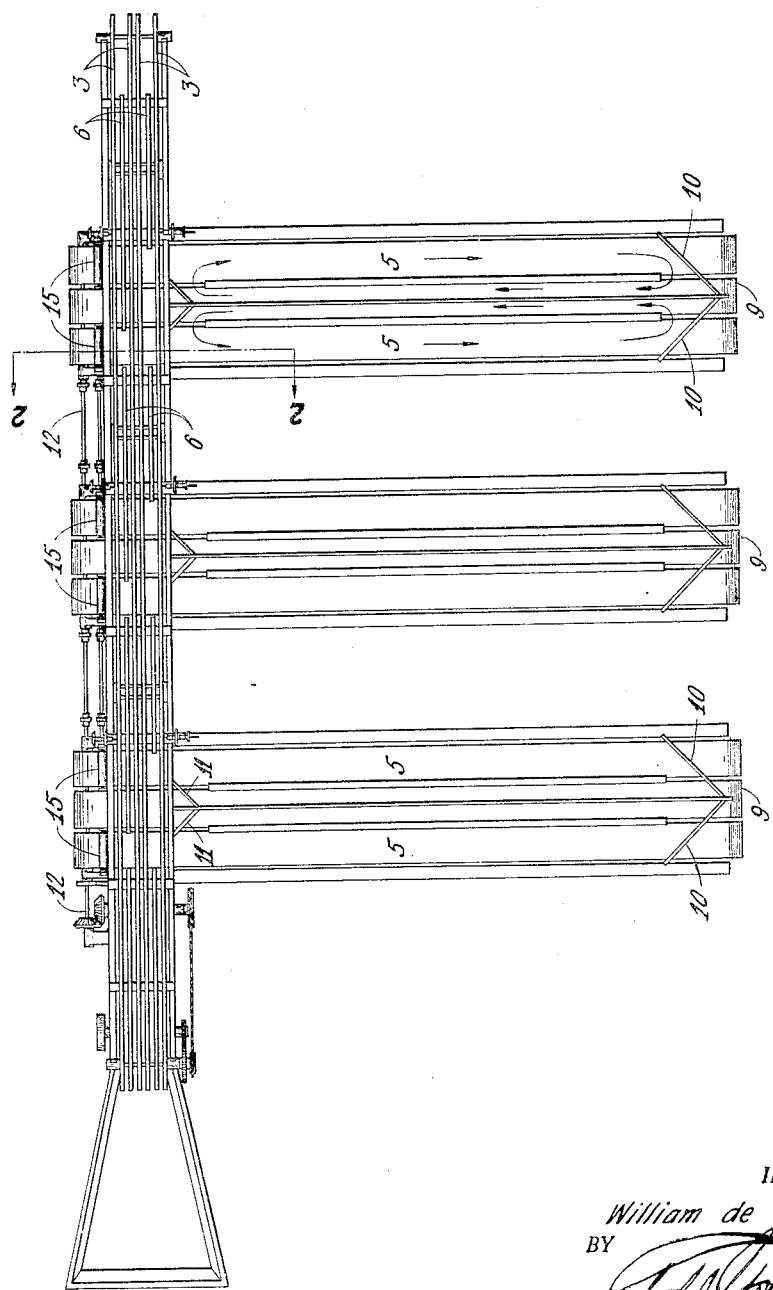
Fig. 1 is a plan view of a fruit sizing apparatus embodying my invention.

For the purpose of illustration, I have shown my invention as applied to the sizing machine disclosed in my above mentioned application, but I have shown herein only so much of the details of such machine as are necessary to an understanding of this invention.

As shown, the frame 1 supported on legs 2 carries two sets of sizing belts 3, having their working faces angularly disposed so as to form open bottomed troughs as best illustrated in Fig. 2. The belts 3 extend the entire length of the apparatus and are so arranged that the belts of each pair diverge from one end to the other. The metal guides 4 serve to support and guide the belts and the outer guides are adjustably mounted as shown whereby to vary the degree of divergence of the belts.

Packing belts 5 are placed at spaced intervals and for each packing belt there is provided a corresponding supplementary carrier belt 6 positioned beneath the sizing belts 3 which serve to catch the fruit as it is released therefrom and deposit it upon the packing belts. In the apparatus illustrated, I have shown three sets of packing belts each set consisting of two belts, one for each grade of fruit. The belts are supported upon the pulleys 7 and 8 and move in the direction indicated, in order to carry the fruit from under the sizing belts past the packers. Between the packing belts of each set operates a return belt 9 moving in a direction opposite to the belts 5 which, with the co-operation of the deflecting barriers 10 and 11 operates to receive any fruit which has passed the packers and return it to the packing belts.

As above pointed out, it is desirable to have all the driving mechanism at the receiving end of the packing belts and, therefore, the belts 5 are driven by means of the pulleys 7 which are keyed to the drive shaft 12, which may be driven from any suitable source of power. Since the upper runs of the belts must move away from the driving pulleys 7, means must be provided for taking up the slack so as to maintain them horizontal. To this end, I have shown under each packing belt, near the driven end, a supporting roller 13 and between the guides 14 is positioned the weighted roller 15. The roller 15 is provided in each end with a ball-bearing 16 which serves to reduce friction and at the same time allow a certain amount of displacement of the roller without jamming. The weight of the roller is such that it takes up the slack of the packing belt and in so doing assumes a position lower than the upper edge of the driving pulley 7 whereby it maintains its proper position and is prevented from rolling off.

It will be seen that with this construction the packing belts can be driven from their receiving end while at the same time the useful portion of the idle run of the belt is maintained in a horizontal position and parallel to the working run.

Having now described my invention and in what manner the same may be used, what I claim is new and desire to secure by Letters Patent is:—

1. In a fruit sizing apparatus, means for separating fruit into groups according to size, an endless packing conveyer having the upper run of one end disposed to receive fruit from said separating means, a driving pulley supporting the receiving end of said conveyer, means for driving said pulley to cause the upper run of the conveyer to travel away from it, an idler pulley supporting the other end of the conveyer, a second idler pulley supporting the upper run of said conveyer at a point between the driving pulley and the point where the fruit is received from the separating means, and means for depressing said upper conveyer run between said second named idler pulley and said driving pulley whereby to remove the slack.

2. In a fruit sizing apparatus, means for separating fruit into groups according to size, an endless packing conveyer having the upper run of one end disposed to receive fruit from said separating means, a driving pulley supporting the receiving end of said conveyer, means for driving said pulley to cause the upper run of the conveyer to travel away from it, an idler pulley supporting the other end of the conveyer, a second idler pulley supporting the upper run of said conveyer, at a point between its driven end and the point of delivery of fruit thereto, and means for taking up the slack of the upper run of the conveyer comprising a freely floating weighted roller resting upon the upper run of the coneveyer between the driving pulley and the second named idler pulley, a socket in each end of the roller, a ball bearing secured in each socket, and a pair of spaced guide walls adjacent the ends of said roller forming bearing surfaces for said ball bearings to limit endwise movement of the roller.

3. In a fruit sizing apparatus, means for separating fruit into groups according to size; an endless packing conveyer having a slack upper run disposed to receive fruit from said separating means adjacent the driven end of the conveyer; fixed means for supporting the slack upper run of said conveyer at a point between its driven end and the point of delivery of fruit thereto and a freely floating roller resting upon the upper run of the conveyer ahead of said supporting means for taking up the slack.

4. In a fruit sizing apparatus, means for separating fruit into groups according to size, an endless packing conveyer having its receiving end projecting beneath the separating means whereby to receive fruit therefrom on its upper run, a driving pulley supporting the receiving end of the conveyer, means for driving the pulley to cause the upper run of the conveyer to travel away from the separating means, an idler pulley supporting the upper run of the conveyer between the driving pulley and the point where the fruit is received from the separating means, and a freely floating weighted roller supported upon the upper run of the conveyer between the driving pulley and the idler pulley whereby to depress the conveyer and take up the slack.

Signed at San Jose, Calif. this 19th day July 1930.

WILLIAM DE BACK.